Oct. 30, 1951     W. J. GREER     2,573,137
ELECTRIC WELL LOGGING SYSTEM

Filed April 21, 1950     2 SHEETS—SHEET 2

INVENTOR.
Walton J. Greer,
BY
Earl Babcock
ATTORNEY.

Patented Oct. 30, 1951

2,573,137

UNITED STATES PATENT OFFICE 2,573,137

ELECTRIC WELL LOGGING SYSTEM

Walton J. Greer, Houston, Tex., assignor to Halliburton Oil Well Cementing Company, Duncan, Okla.

Application April 21, 1950, Serial No. 157,309

6 Claims. (Cl. 175—182)

This inventon relates to the electrical logging of oil wells or the like and more particularly to a system using frequency modulated signals and capable of making a number of logs simultaneously.

The present invention relates to improvements in frequency modulation logging systems of the type shown in my co-pending application for patent, Serial No. 44,149, filed August 13, 1948, for "Well Logging Systems." In said co-pending application, an electrical system is provided which employs frequency modulation of several carrier frequencies in accordance with the amplitudes of potentials coming from different pick-up electrodes in a borehole, the signals passing through a single conductor cable to the surface of the ground while alternating current of a different frequency is conducted through the same conductor to current electrodes in the borehole.

In putting the system of said co-pending application into operation, it was discovered that even though it constituted a marked improvement over conventional logging systems, still some errors crept into the signals due to the leakage or inducement of unwanted signals of the basic power frequency into the modulating or oscillator circuits. Since these unwanted signals were of the same frequency as the signals from the formation it was difficult to discriminate between them and errors could result.

The present invention provides an arrangement for eliminating or at least greatly reducing these errors by the use of a frequency converter in the assembly in the borehole, the purpose of which is to cause the formation current to have a different frequency than that which is transmitted from the source at the surface of the ground down the cable.

Frequency dividers are old and well known in the art. However, ordinary frequency dividers are not suitable for the particular purpose of frequency conversion in a borehole because they are not capable of providing an efficient power transfer, especially since they have to be designed to be mounted in the confined space of an electrode assembly. It is a serious problem to provide sufficient formation current in any logging system and it is imperative that as little as possible be wasted. The system of the present invention includes a frequency converter primarily designed to give an efficient power transfer and yet be capable of use in a confined space. The frequency converter may or may not be of a novel design but no claim is made to it, per se. The invention sought to be protected is the combination of the particular frequency converter hereinafter described with the essential elements of a frequency modulation logging system.

Figure 1:
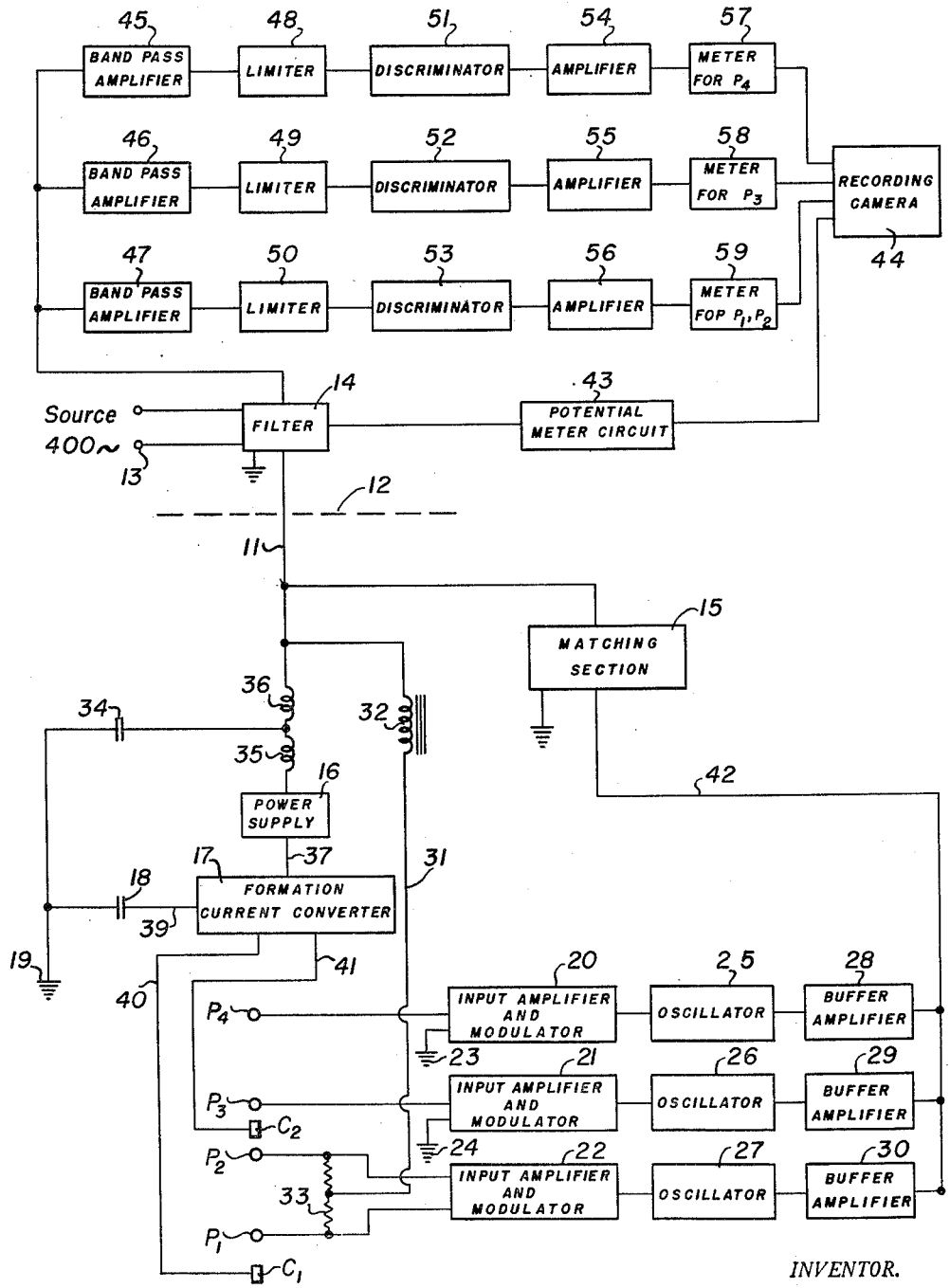
Fig. 1 is a diagrammatic representation of a logging system constructed in accordance with the principles of the present invention with the essential component parts shown only roughly as rectangles but illustrating how the various parts are arranged.

Referring to the drawing in detail and first to the arrangement shown in Fig. 1, it will be seen that the system illustrated includes a number of electrical devices connected together to form an electrical logging system. The single line designated 11 in Fig. 1 represents the single conductor of a cable. The portion of the system above the dashed line 12 on the conductor 11 represents equipment at the surface of the ground, while the equipment below the dashed line 12 represents equipment in the electrode assembly or carriage which is lowered into the borehole in the making of an electric log.

As shown, the equipment lowered into the borehole includes a number of electrodes, these being designated $C_1$, $C_2$, and $P_1$, $P_2$, $P_3$, and $P_4$. The electrodes $C_1$ and $C_2$ are represented, for convenience, as rectangles, while the electrodes $P_1$, $P_2$, $P_3$, and $P_4$ are shown as small circles. The electrodes $C_1$ and $C_2$ are current electrodes used to cause an alternating current to flow through mud in the well bore and through the earth formations around it. The total flow between these electrodes is called the formation current.

Electrodes $P_1$, $P_2$, $P_3$, and $P_4$ are pick-up electrodes. They are used for determining the potential drop in the borehole caused by the passage of formation current between electrodes $C_1$ and $C_2$ in the making of "resistivity" logs.

The electrode configuration is such that several resistivity curves may be made simultaneously with a natural potential curve. The kind of resistivity curve, that is, whether it is a single electrode curve, a two electrode curve, a three electrode curve or a four electrode curve, as these terms are used in the art, and also the spacing between the electrodes may be selected as desired. For purposes of illustration, the system herein described in addition to making a natural potential curve, makes the following: (1) A short spaced four electrode resistivity curve, the potential of which is that existing across pick-up electrodes P1 and P2 located in between current electrodes C1 and C2; (2) A medium spaced three electrode resistivity curve, the potential of which is that existing between pick-up electrode P3 and the ground at the surface or on the sheath of the cable or other remote point; and (3) A long spaced three electrode resistivity curve, the potential of which is that existing between pick-up electrode P4 and the ground at the surface or the sheath of the cable or other remote point.

At the surface of the ground the system of Fig. 1 includes a source of alternating current designated 13. This may have a frequency of 400 cycles as indicated. None of the power from the source 13 is used to operate the surface equipment. (The source or sources for the surface equipment are standard and not shown in the drawing.) All of the power from source 13 is sent down the cable 11 into the borehole to cause formation current to flow between the current electrodes C1 and C2 and to supply power for the oscillator tubes and other equipment in the electrode assembly.

The circuit for source 13 includes a filter arrangement 14, the purpose of which is to keep current from it out of the recording system and out of the potential meter. One terminal of the source 13 is grounded at this point while the other terminal is connected to the conductor 11. The equipment in the electrode carriage includes the matching section designated 15, the purpose of which is to impress upon the conductor 11 of the cable the carrier signals modulated in frequency in accordance with the alternating current potentials on pick-up electrodes in the well bore. The circuit for the source 13 also includes a power supply 16, the main purpose of which is to convert some of the energy from the source 13 into voltages suitable for operating the vacuum tubes and other equipment in the electrode assembly. A condenser 18 may be located between the frequency converter 17 and ground 19 to furnish a path for completing the 400 cycle circuit and to block the natural potential from ground.

The current impressed upon the current electrodes C1 and C2 by the formation current converter 17 may be 200-cycle alternating current. The potential picked up by the pick-up electrodes is also of 200-cycle frequency. Variations in resistivity of the earth formations cause corresponding differences in alternating current potential to exist at various points in the vicinity of the current electrodes C1 and C2.

As mentioned above, the system shown in Fig. 1 may be arranged to make three resistivity curves. Accordingly, there are three signal receiving circuits each having an input amplifier and modulator. These are designated 20, 21 and 22. One input terminal of modulator 20 is connected to pick-up electrode P4 while the other is grounded as shown at 23. (All grounds in the borehole may be effected by means of the sheath on the cable or by connecting to a remote electrode.) Likewise, one input terminal of modulator 21 is connected to pick-up electrode P3 while the other is grounded as shown at 24. Modulator 22 is connected to the pick-up electrodes P1 and P2; and hence, there is no ground upon it.

The modulators 20, 21 and 22 are connected to and control oscillators 25, 26 and 27, respectively, each oscillator having a different carrier frequency. For a detailed explanation of the operation of this portion of the system reference may be had to my copending application Serial No. 44,149 mentioned above. Each oscillator is connected to a buffer amplifier, these being designated 28, 29 and 30. The signal output of the three buffer amplifiers is fed by conductor 42 into the matching section 15 which serves to impress the signals upon the conductor 11 of the cable.

The natural earth potential may be impressed upon the conductor 11 of the cable by a conductor 31 connected to the mid-point of a resistor 33 across pick-up electrodes P1 and P2. A choke 32 prevents alternating current, either that from the source 13 or that of the signals, from entering the conductor 31.

The equipment in the electrode carriage includes a filter consisting of two coils 35 and 36 and a condenser 34 connected as illustrated between the conductor 11 and the ground 19. This filter keeps all frequencies appreciably above 400 cycle out of the power supply 16 and the formation current converter 17. For convenience in understanding the circuit in Fig. 2, reference character 37 has been applied to the lead from the power supply 16 to the formation current converter 17 and the reference characters 39, 40 and 41 applied to conductors leading from the formation current converter to the condenser 18 and the current electrodes C1 and C2, respectively.

The natural potential signal may be fed through a potential meter circuit 43 directly to the recording camera 44. The natural earth potential is passed up the conductor 11 of the cable as a direct current and is measured by a circuit similar to that now commonly used for this purpose.

As to the resistivity signals, that is, the three frequency modulated signals passing up through the conductor 11 of the cable, all are separated from the D. C. natural potential signal in the filter 14. In order to separately measure these signals they must then be separated from each other. To this end suitable band pass amplifiers are provided, these being designated 45, 46 and 47.

Each of the band pass amplifiers 45, 46 and 47 contains a band pass filter circuit and each is designed to pass one of the carrier frequencies, with the variations thereon which constitute the signal, set up by the oscillators 25, 26 and 27 in the well bore.

The outputs of the band pass amplifiers, which carry the three signals are passed through devices known as limiters. These are designated 48, 49 and 50. Their purpose is to remove some causes of error. The outputs of the limiters are fed to devices known as discriminators, designated 51, 52 and 53. These discriminators may be of that type commonly used in frequency modulation radio reception.

The outputs from the discriminators 51, 52 and 53 may be amplified by band pass amplifiers 54, 55 and 56 which pass only 200 cycle signals. Outputs from the amplifiers are impressed upon suitable meter circuits such as those designated 57, 58 and 59 and then fed into the recording camera 44, where the logs or curves are made.

Figure 2:
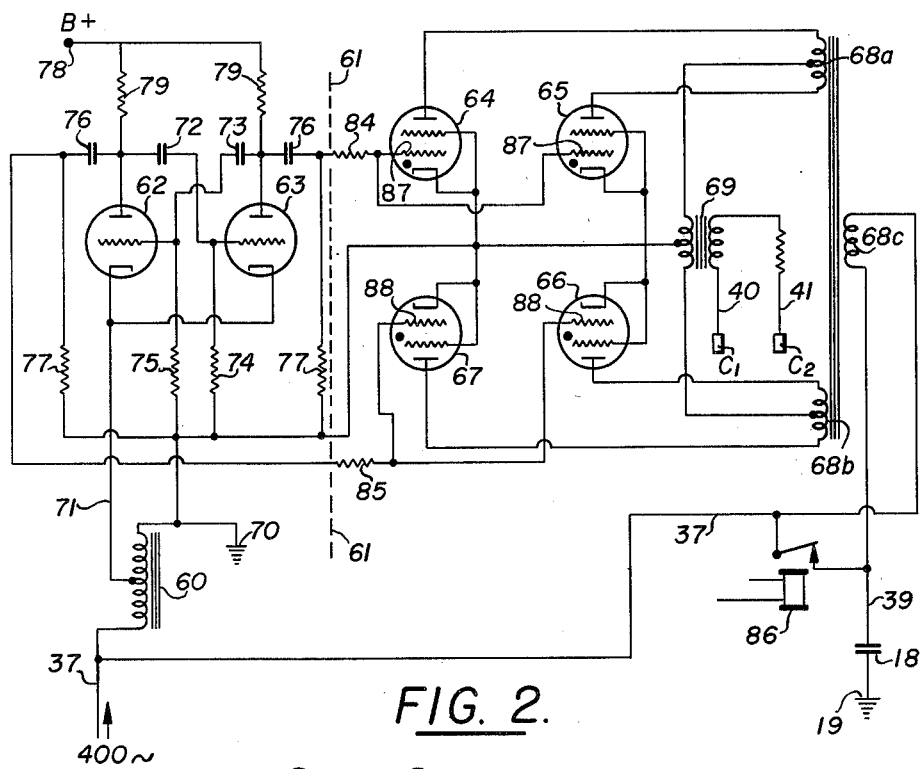
Fig. 2 is a circuit diagram of the formation current frequency converter of the system of Fig. 1.
Figure 3:
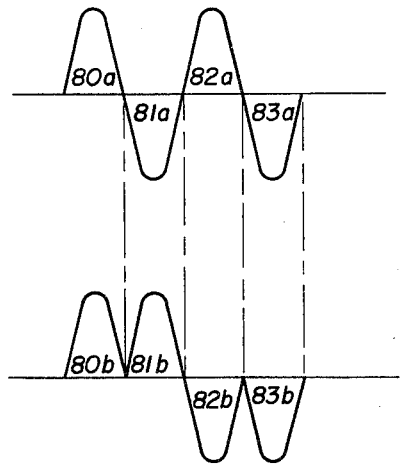
Fig. 3 is simulated diagrammatic representation of the operation of the frequency converter of Fig. 2.

An important part of the system of the present invention is the formation current converter 17 and its circuit is shown in detail in Fig. 2. It was stated above that the alternating current source 13 might have a frequency of 400 cycles per second and that the converter 17 changed this to 200 cycles. Of course, sources of other frequencies might be employed but the converter is so designed as to cut the frequency exactly in half by reversing two adjacent half waves while not changing the other two half-waves of a double wave, as indicated in Fig. 3.

At the lower left side of the diagram of Fig. 2, the 400 cycle current is shown as being supplied to the converter through the conductor 37. The 200 cycle output of the converter is connected to the current electrodes $C_1$ and $C_2$ by conductors 40 and 41.

The portion of the circuit at the left of the dashed line 61 of Fig. 2 is a conventional frequency divider and includes tubes 62 and 63. It is used to get a 200 cycle trigger voltage for the power converter circuit shown at the right of the dashed line 61 and which includes tubes 64, 65, 66 and 67 and transformers 68 and 69.

The frequency divider consists of a multivibrator circuit designed to operate at a nominal frequency of 200 cycles. It is synchronized to exactly one-half the supply frequency by feeding a small potential of the supply frequency into the cathode circuits of the tubes 62 and 63 employed in the multivibrator. This synchronizing signal is furnished by the autotransformer 60, the primary coil of which is connected between the 400 cycle supply and ground 70 while the mid-point of the coil of the transformer 60 is connected to the cathodes of the tubes 62 and 63 by the conductor 71. The plate of each of the tubes 62 and 63 is connected through a condenser to the grid of the other tube and then through a resistor to ground 70. These condensers are designated 72 and 73 and the resistors 74 and 75. Each plate also has a plate circuit which consists of a condenser 76 and a resistor 77 to ground at 70 and each is, of course, connected to a source of plate voltage 78 marked B+ through suitable resistors 79. Because of the synchronizing action, the supply frequency at 37 can be permitted to vary appreciably from 400 cycles without upsetting the power conversion action.

The purpose of the converter of Fig. 2 is to bring about changes in wave shape as indicated diagrammatically at 80, 81, 82 and 83 in Fig. 3. The manner in which this is brought about can best be explained by a consideration of Figs. 2 and 3 together. When tube 63 of the multivibrator conducts, a negative potential is applied to the control grids 87 of gas tubes 64 and 65 and prevents both of these gas tubes from conducting, regardless of the potentials that may be applied between the plates and cathodes thereof. During the period that tube 63 conducts, tube 62 is cut off and a positive potential is applied to the control grids 88 of gas tubes 66 and 67. This allows the conduction of current between the plates and cathodes of these gas tubes anytime that the polarity of the current is correct.

When tube 62 of the multivibrator conducts, a negative potential is applied to the control grids 88 of gas tubes 66 and 67 and prevents both of these gas tubes from conducting, regardless of the potentials that may be applied between the plates and cathodes thereof. During the period that tube 62 conducts, tube 63 is cut off and a positive potential is applied to the control grids 87 of gas tubes 64 and 65 and allows the conduction of current between the plates and cathodes of these gas tubes anytime that the polarity of the current is correct. Resistors 84 and 85 are provided to limit the grid current of the gas tubes to a safe value.

The operation of the power converter can be demonstrated by following selected half cycles of the 400 cycle current such as shown at 80a, 81a, 82a, 83a of Fig. 3 through the circuit. Consider that during the period of half cycle 80a, the potentials at the plates of tubes 64 and 66 are positive with respect to the cathodes, and the potential at the plates of tubes 65 and 67 are negative with respect to ground. These potentials are determined by the secondary windings 68a and 68b of a transformer whose primary winding is 68c. 400 cycle current from the source 13 passes through the primary winding 68c. During the period of half cycle 81a, the potentials at the plates of tubes 65 and 67 are positive with respect to the cathodes, and the potentials at the plates of tubes 64 and 66 are negative with respect to the cathodes. The potentials at the plates, with respect to the cathodes, of the gas tubes during the period of half cycle 82a, are the same as during the period of half cycle 80a. The potentials at the plates, with respect to the cathodes, of the gas tubes during the period of half cycle 83a are the same as during the period of half cycle 81a.

Consider that during the period of half cycles 80a and 81a, tube 62 is conducting and tube 63 is cut off; and during the period of half cycles 82a and 83a, tube 63 is conducting and tube 62 is cut off.

During the period of 80a, current will flow through the circuit from the top of winding 68a to the plate of tube 64, through tube 64 to its cathode, to the mid-point of the primary winding of transformer 69, from top of this winding to the mid-point of the winding 68a. The current flow through the primary winding of transformer 69 in the direction indicated results in a current of a form indicated by 80b to flow in the formation circuit between electrodes $C_1$ and $C_2$. During the period of 80a, no other gas tube conducts and no other current passes through the primary winding of transformer 69. During this period, tube 6 is prevented from conducting by the negative potential applied to its control grid 88. Tubes 65 and 67 have negative potentials at the plates with respect to the cathodes and will not conduct.

During the period of 81a, current will flow through the circuit from the bottom of winding 68a to the plate of tube 65, through tube 65 to its cathode, to the mid-point of the primary winding of transformer 69, from the top of this winding to the mid-point of the winding 68a. The current flow through the primary winding of transformer 69 in the direction indicated results in a current of a form indicated by 81b to flow in the formation circuit between electrodes $C_1$ and $C_2$. During the period of 81a, no other gas tube conducts and no other current passes through the primary winding of transformer 69. During this period, tube 67 is prevented from conducting by the negative potential applied to its control grid 88. Tubes 64 and 66 have negative potentials at the plates with respect to the cathodes and will not conduct.

During the period of 82a, current will flow through the circuit from the top of winding 68b to the plate of tube 66, through tube 66 to its cathode, to the mid-point of the primary winding of transformer 69, from the bottom of this winding to the mid-point of the winding 68b. The current flow through the primary winding of transformer 69 in the direction indicated will result in a current of a form indicated by 82b to flow in the formation circuit between electrodes $C_1$ and $C_2$. During the period of 82a, no other gas tube conducts and no other current passes through the primary winding of transformer 69. During this period, tube 64 is prevented from conducting by the negative potential applied to its control grid 87. Tubes 65 and 67 have negative potentials at the plates with respect to the cathodes and will not conduct.

During the period of 83a, current will flow through the circuit from the bottom of winding 68b to the plate of tube 67, through tube 67 to its cathode, to the mid-point of the primary winding of transformer 69, from the bottom of this winding to the mid-point of the winding 68b. The current flow through the primary winding of transformer 69 in the direction indicated results in a current of a form indicated by 83b to flow in the formation circuit between electrodes C1 and C2. During the period of 83a, no other gas tube conducts and no other current passes through the primary winding of transformer 69. During this period, tube 65 is prevented from conducting by the negative potential applied to its control grid 87. Tubes 64 and 66 have negative potentials at the plates with respect to the cathodes and will not conduct.

During the periods of subsequent half cycles, the action described for periods of half cycles 80a, 81a, 82a, and 83a repeats itself.

A mathematical analysis of the wave form indicated by 80b, 81b, 82b, and 83b proves that the total current is made up primarily of that with a frequency of half that represented by 80a, 81a, 82a, 83a. Minor portions of the total current is made up of currents of frequencies of odd harmonics of the frequency of the major current. In the case described, 80a, 81a, 82a, and 83a represent a current of 400 cycles per second. 80b, 81b, 82b, and 83b represent a fundamental current of 200 cycles per second with minor amounts of currents of 600 cycles per second, 1000 cycles per second, 1400 cycles per second, etc. Band pass amplifiers 54, 55, and 56 pass only signals of 200 cycles per second plus or minus a few cycles to allow for deviations in the frequency of power source 13. Thus, for the logging operation, only the 200 cycles per second component need be considered. Any stray signals of the basic power frequency or any harmonics of that frequency getting into the measuring and transmitting circuits are blocked from the final metering and recording sections of the logging system.

It should be noted that the power converter described is capable of converting current of any frequency to one-half, one-third, one-fourth, or any full fraction of that frequency, with a practical limit of about one-tenth of the primary frequency. Any of these other frequencies can be realized by making the frequency divider multivibrator to operate at the desired frequency.

The relay 86 shown in Fig. 2 is a delayed acting device which maintains a short circuit across the primary winding 68c of the power transformer and thus prevents power from being applied to the gas tube circuits until several seconds after the heaters of the gas tubes are turned on. This prevents damage to the cathodes of these tubes which would result if power were applied before they reached a satisfactory operating temperature.

While only one embodiment of the invention has been shown and described herein, it is obvious that various changes may be made without departing from the spirit of the invention or the scope of the annexed claims.

I claim:

1. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between said current electrodes, frequency modulation signalling circuits connected to said pick-up electrodes and the conductor of the cable for transmitting signals to measuring apparatus at the surface of the ground and a frequency converter at the lower end of the cable for causing the formation current to have a different frequency than that transmitted through the conductor of the cable from said source.

2. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between said current electrodes, frequency modulation signalling circuits connected to said pick-up electrodes and the conductor of the cable for transmitting signals to measuring apparatus at the surface of the ground and a frequency converter at the lower end of the cable for causing the formation current to have a different frequency than that transmitted through the conductor of the cable from said source, said frequency converter including a frequency divider circuit and a power converter circuit, said frequency divider circuit being so designed to obtain a trigger voltage of a different frequency than said source and being so arranged as to control the power converter circuit accordingly.

3. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between said current electrodes, frequency modulation signalling circuits connected to said pick-up electrodes and the conductor of the cable for transmitting signals to measuring apparatus at the surface of the ground and a frequency converter at the lower end of the cable for causing the formation current to have a different frequency than that transmitted through the conductor of the cable from said source, said frequency converter including a frequency divider circuit and power converter circuit having four tubes controlled by said frequency divider circuit, said frequency divider circuit being so designed as to obtain a trigger voltage of a frequency one-half that of said source and the arrangement being such that two adjacent halfwaves of a double wave of current from said source are reversed while the other two halfwaves of the double wave are not changed.

4. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between the current electrodes, frequency modulation signalling circuits, each including a modulator, an oscillator and a buffer amplifier with each of the oscillators operating at a different carrier frequency than the others, connected to the pick-up electrodes and to the conductor of the cable for transmitting signals up the cable, measuring apparatus at the surface of the ground connected to the conductor of the cable and including meters and circuits for transmitting the frequency modulated signals selectively to the meters and a frequency converter at the lower end of the cable for causing the formation current to have a different frequency than that transmitted from the conductor of the cable from said source.

5. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between the current electrodes, frequency modulation signalling circuits, each including a modulator, an oscillator and a buffer amplifier with each of the oscillators operating at a different carrier frequency than the others, connected to the pick-up electrodes and to the conductor of the cable for transmitting signals up the cable, measuring apparatus at the surface of the ground connected to the conductor of the cable and including meters and circuits for transmitting the frequency modulated signals selectively to the meters and a frequency converter at the lower end of the cable for causing the formation current to have a different frequency than that transmitted from the conductor of the cable from said source, said frequency converter including a frequency divider circuit and a power converter circuit, said frequency divider circuit being so designed as to obtain a trigger voltage of a different frequency than that of said source and being so arranged as to control the power converter circuit accordingly.

6. In an electrical system for making simultaneously a plurality of resistivity logs of earth formations along a borehole, the combination with a single conductor cable having current electrodes and pick-up electrodes at its lower end of a source of alternating current at the surface of the ground connected to the conductor of the cable and arranged to cause a formation current to flow between the current electrodes, frequency modulation signalling circuits, each including a modulator, an oscillator and a buffer amplifier with each of the oscillators operating at a different carrier frequency than the others, connected to the pick-up electrodes and to the conductor of the cable for transmitting signals up the cable, measuring apparatus at the surface of the ground connected to the conductor of the cable and including meters and circuits for transmitting the frequency modulated signals selectively to the meters and a frequency converter at the lower end of the cable for causing the formation current to have a different frequency than that transmitted from the conductor of the cable from said source, said frequency converter including a frequency divider circuit and a power converter circuit having four tubes controlled by said frequency divider circuit, said frequency divider circuit being so designed as to obtain a trigger voltage of a frequency one-half that of said source and the arrangement being such that two adjacent half-waves of a double wave of current from said source are reversed while the other two half-waves of the double wave are not changed.

WALTON J. GREER.

No references cited.